US 9,896,952 B2

(12) United States Patent
Matsumoto et al.

(10) Patent No.: US 9,896,952 B2
(45) Date of Patent: Feb. 20, 2018

(54) ROTATING MACHINE

(71) Applicant: MITSUBISHI HITACHI POWER SYSTEMS, LTD., Kanagawa (JP)

(72) Inventors: Kazuyuki Matsumoto, Tokyo (JP);
Yoshihiro Kuwamura, Tokyo (JP);
Hiroharu Oyama, Tokyo (JP);
Yoshinori Tanaka, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 250 days.

(21) Appl. No.: 14/434,896

(22) PCT Filed: Oct. 17, 2013

(86) PCT No.: PCT/JP2013/078181
§ 371 (c)(1),
(2) Date: Apr. 10, 2015

(87) PCT Pub. No.: WO2014/061736
PCT Pub. Date: Apr. 24, 2014

(65) Prior Publication Data
US 2015/0300190 A1  Oct. 22, 2015

(30) Foreign Application Priority Data
Oct. 18, 2012  (JP) .................. 2012-230746

(51) Int. Cl.
*F01D 11/08* (2006.01)
*F01D 11/00* (2006.01)
*F16J 15/447* (2006.01)

(52) U.S. Cl.
CPC ............ *F01D 11/001* (2013.01); *F01D 11/08* (2013.01); *F16J 15/4472* (2013.01)

(58) Field of Classification Search
CPC ...... F01D 11/001; F01D 11/08; F16J 15/4472
See application file for complete search history.

(56) References Cited

U.S. PATENT DOCUMENTS 4,057,362 A   11/1977   Schwaebel
5,704,614 A   1/1998    Sanders
(Continued)

FOREIGN PATENT DOCUMENTS

CN   1195396      10/1998
DE   1 159 227    12/1963
(Continued)

OTHER PUBLICATIONS

International Search Report dated Jan. 21, 2014 in corresponding International Application No. PCT/JP2013/078181 (with English translation).
(Continued)

*Primary Examiner* — Craig Kim
*Assistant Examiner* — Michael Sehn
(74) *Attorney, Agent, or Firm* — Wenderoth, Lind & Ponack, L.L.P.

(57) ABSTRACT

A steam turbine through which a fluid flows along an axis is equipped with: a tip shroud for turbine blades that are provided on a shaft that extends with the axis as a center; an outer partition plate ring that is provided on a casing so as to face the tip shroud in a radial direction and be capable of rotating relative to the tip shroud around the axis; seal fins that extend radially inward from the outer partition plate ring and that, with the tip shroud, form minute gaps therebetween; and steam introduction surfaces that are formed on downstream sides of the seal fins and are provided so as to face the seal fins within cavities where a main vortex, generated from a leakage flow passing through a minute gap, is generated, and that guide the flow, generated from the main vortex, toward the minute gaps.

5 Claims, 6 Drawing Sheets

(56) References Cited

U.S. PATENT DOCUMENTS

| | | | | |
|---|---|---|---|---|
| 7,445,213 B1* | 11/2008 | Pelfrey | | F01D 11/02 277/418 |
| 7,708,520 B2* | 5/2010 | Paolillo | | F01D 11/001 415/174.5 |
| 8,206,082 B2* | 6/2012 | Sanchez | | F16J 15/4472 277/418 |
| 2010/0278645 A1* | 11/2010 | Narita | | F01D 1/02 415/230 |
| 2014/0252721 A1* | 9/2014 | Gore | | F01D 11/02 277/418 |

FOREIGN PATENT DOCUMENTS

| | | | | |
|---|---|---|---|---|
| DE | 1159227 B | * | 12/1963 | F16J 15/4472 |
| JP | 09324655 A | * | 12/1997 | |
| JP | 2002-228014 | | 8/2002 | |
| JP | 2006-291967 | | 10/2006 | |
| JP | 2011-080452 | | 4/2011 | |
| JP | 2011-208602 | | 10/2011 | |
| JP | 2012-137006 | | 7/2012 | |

OTHER PUBLICATIONS

Written Opinion dated Jan. 21, 2014 in corresponding International Application No. PCT/JP2013/078181 (with English translation).
Office Action dated Nov. 20, 2015 in Chinese Application No. 201380053935.X (with English translation of Search Report).
Decision to Grant dated Dec. 1, 2016 in corresponding European Application No. 13847399.6.
Extended European Search Report dated Oct. 21, 2015 in European Application No. 13847399.6.

* cited by examiner

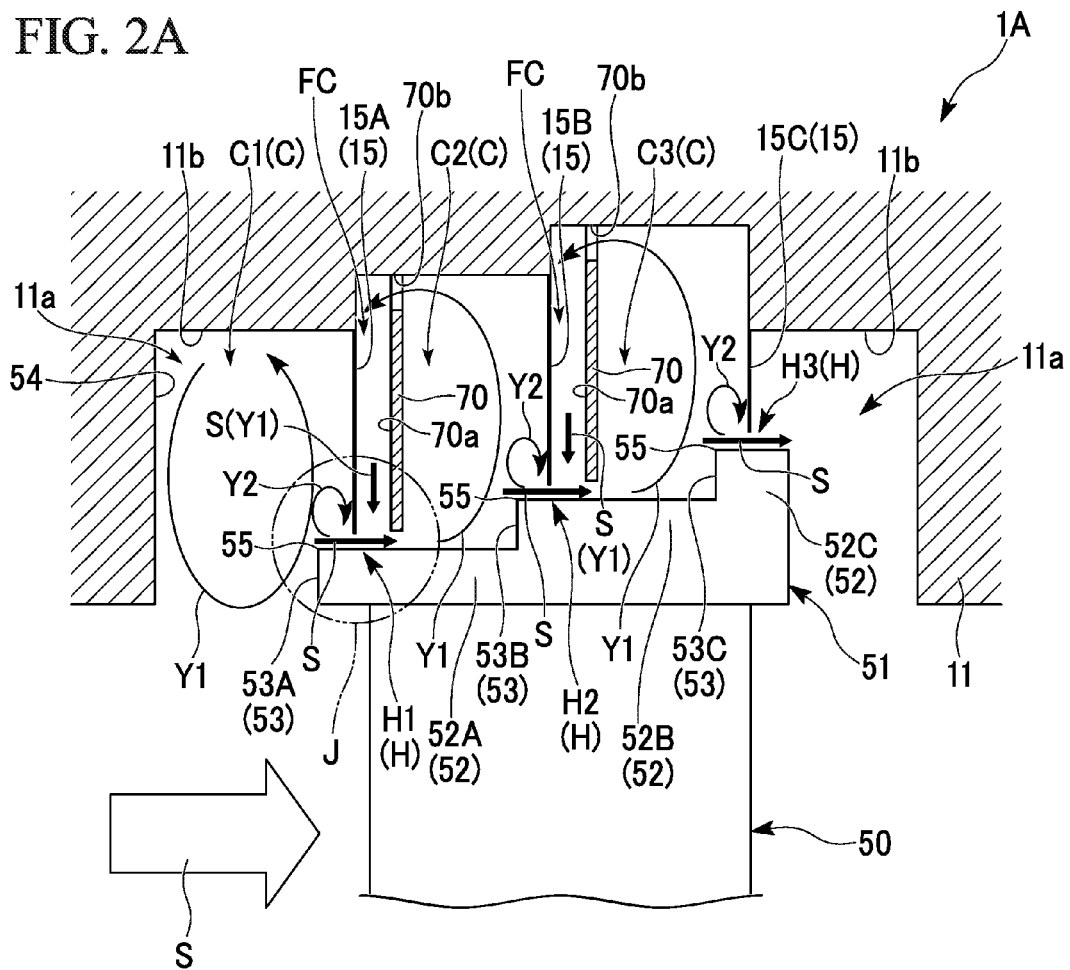
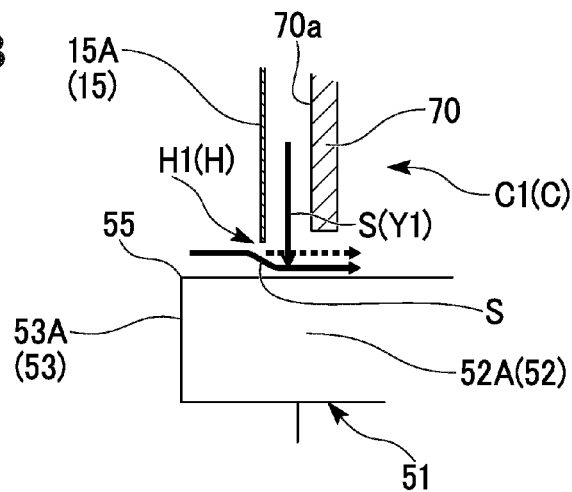

ROTATING MACHINE

TECHNICAL FIELD

The present invention relates to a seal structure for a rotating machine, such as a turbine or a compressor.

Priority is claimed on Japanese Patent Application No. 2012-230746, filed Oct. 18, 2012, the content of which is incorporated herein by reference.

BACKGROUND ART

As a widely known type of rotating machine, there is an axial flow type turbine equipped with a casing, a rotating shaft that is rotatably provided inside the casing, a plurality of turbine vanes that are fixedly arranged at an inner peripheral portion of the casing, and a plurality of turbine blades that are radially provided on the rotating shaft on downstream sides of the plurality of turbine vanes. In the turbine, power is obtained by converting the pressure energy of a fluid into rotational energy. In addition, when the turbine is an impulse turbine, the pressure energy of the fluid is converted into kinematic energy by the turbine vanes, and this kinematic energy is converted into rotational energy by the turbine blades. Additionally, when the turbine is a reaction turbine, the pressure energy is converted into kinematic energy even within the turbine blades, and the kinematic energy is converted into rotational energy by a reaction force with which the fluid is jetted.

In such a turbine, gaps are formed in a radial direction between tip portions of the turbine blades that are rotary bodies (rotors), and a casing that is a stationary body (stator). Additionally, gaps in the radial direction are also formed between the tip portions of the turbine vanes that are stationary bodies and the rotating shaft that is a rotary body. For this reason, although a portion of the fluid leaks toward a downstream side through the gaps between the tip portions of the turbine blades and the casing, this leakage fluid does not apply rotary power to the turbine blades. Additionally, since the pressure energy of a leakage fluid, which passes toward the downstream side through the gaps between the tip portions of the turbine vanes and the rotating shaft, is not converted into kinematic energy by the turbine vanes, rotary power is hardly applied to the turbine blades on the downstream side. Therefore, in order to improve the performance of the turbine, it is important to reduce a fluid flow (leakage flow rate) that passes through the above gaps.

Here, for example, Patent Document 1 suggests a turbine having a structure in which a tip portion of a turbine blade is provided with a plurality of stepped portions the height of which becomes greater gradually from an upstream side toward a downstream side in an axial direction, the casings are provided with a plurality of seal fins that extend toward the respective stepped portions, and minute gaps are formed between the respective stepped portions and tips of the respective seal fins.

In this turbine, as a fluid that has entered the above gap from an upstream side collides against the stepped surface of each stepped portion, a main vortex is generated on the upstream side of the stepped surface. Additionally, a separation vortex resulting from the main vortex is generated on the downstream side (in the vicinity of the upstream side of the minute gap) of the stepped surface. By virtue of this separation vortex, the leakage flow rate is reduced by reducing a leakage flow that passes through the minute gap.

PRIOR ART DOCUMENT

Patent Document

[Patent Document 1] Japanese Unexamined Patent Application, First Publication No. 2011-080452

SUMMARY OF INVENTION

Technical Problem

However, regarding the main vortex caused by the stepped portion disclosed in Patent Document 1, the flow direction of a fluid that forms the main vortex in the vicinity of the downstream side of the above minute gap is not directed to the radial direction, and is a direction that inclines with respect the radial direction toward the downstream side. For this reason, a dead water region is formed in the vicinity of the downstream side of the above minute gap. That is, in this dead water region, the fluid of the main vortex is not able to have direct influence on the fluid that passes through the minute gap, and the flow reduction effect of the leakage flow becomes weak.

The invention provides a rotating machine that can further reduce leakage flow rate.

Technical Solution

According to a first aspect of the invention, a rotating machine through which a fluid flows along an axis includes a rotor that extends with the axis as a center; a stator that is provided so as to face a radial direction of the rotor and be capable of rotating relative to the rotor around the axis; a seal fin that extends from one of the rotor and the stator to the other and forms a gap between the seal fin and the other; and a fluid introduction surface that is formed on a downstream side of the seal fin and is provided so as to face the seal fin within a cavity where a vortex, generated from a leakage flow passing through the gap, is generated, and that guides the flow, generated from the vortex, toward the gap.

According to such a rotating machine, the leakage flow that has passed through the gap can be directed toward the other on the downstream side of the seal fin by guiding the vortex fluid generated from the leakage flow within the cavity to the above gap through between the seal fin and the fluid introduction surface. Therefore, the flow reduction effect of the leakage flow can be improved.

Additionally, the fluid introduction surface may be provided to incline such that the fluid introduction surface is directed from a downstream side toward an upstream side, toward the other side from the one side.

As the fluid introduction surface is provided in this way, more vortex fluid can be guided between the seal fin and the fluid introduction surface. Moreover, since the space between the seal fin and the fluid introduction surface becomes narrower toward the gap, the flow velocity of a flow guided toward the gap can be increased. For this reason, the flow contraction effect of the leakage flow can be further improved, and the leakage flow rate can be further reduced.

Moreover, the fluid introduction surface may be a surface that directed to an upstream side of a partition plate provided along the seal fin, and a communication portion, which allows a space defined between the partition plate and the seal fins and a space of the cavity on a downstream side of the partition plate to communicate with each other, may be formed on the one side in the partition plate.

By virtue of such a partition plate, the vortex fluid can be reliably guided toward the space between the seal fin and the fluid introduction surface from the communication portion, the flow reduction effect of the leakage flow is further improved, and the leakage flow rate can be further reduced.

According to a second aspect of the invention, the rotating machine may further include a stepped surface that is provided at a position that faces the gap, at a position that becomes a downstream side of the seal fin in the other of the rotor and the stator, and that guides the leakage flow to the one side within the cavity toward an upstream side.

As the leakage flow collides against such a stepped surface, the vortex can be reliably generated within the cavity. As a result, more fluid can be guided to between the seal fin and the fluid introduction surface, and the leakage flow rate can be further reduced.

Advantageous Effects of Invention

According to the above-described rotating machine, it is possible to guide a vortex fluid between the seal fin and the fluid introduction surface, thereby directing the leakage flow passing through the gap to the downstream side of the seal fin and further reducing the leakage flow rate.

BRIEF DESCRIPTION OF DRAWINGS

FIG. 2A is a view illustrating the steam turbine according to the first embodiment of the invention, and is an enlarged cross-sectional view illustrating an main portion I in FIG. 1.

FIG. 2B is a view illustrating the steam turbine according to the first embodiment of the invention, and is an enlarged cross-sectional view illustrating an main portion J in FIG. 2A.

DESCRIPTION OF EMBODIMENTS

First Embodiment

Hereinafter, a steam turbine 1A according to an embodiment of the invention will be described.

The steam turbine 1A is an external combustion engine that captures the energy of steam S as rotative power, and is used for generators in power plants or the like.

Figure 1:
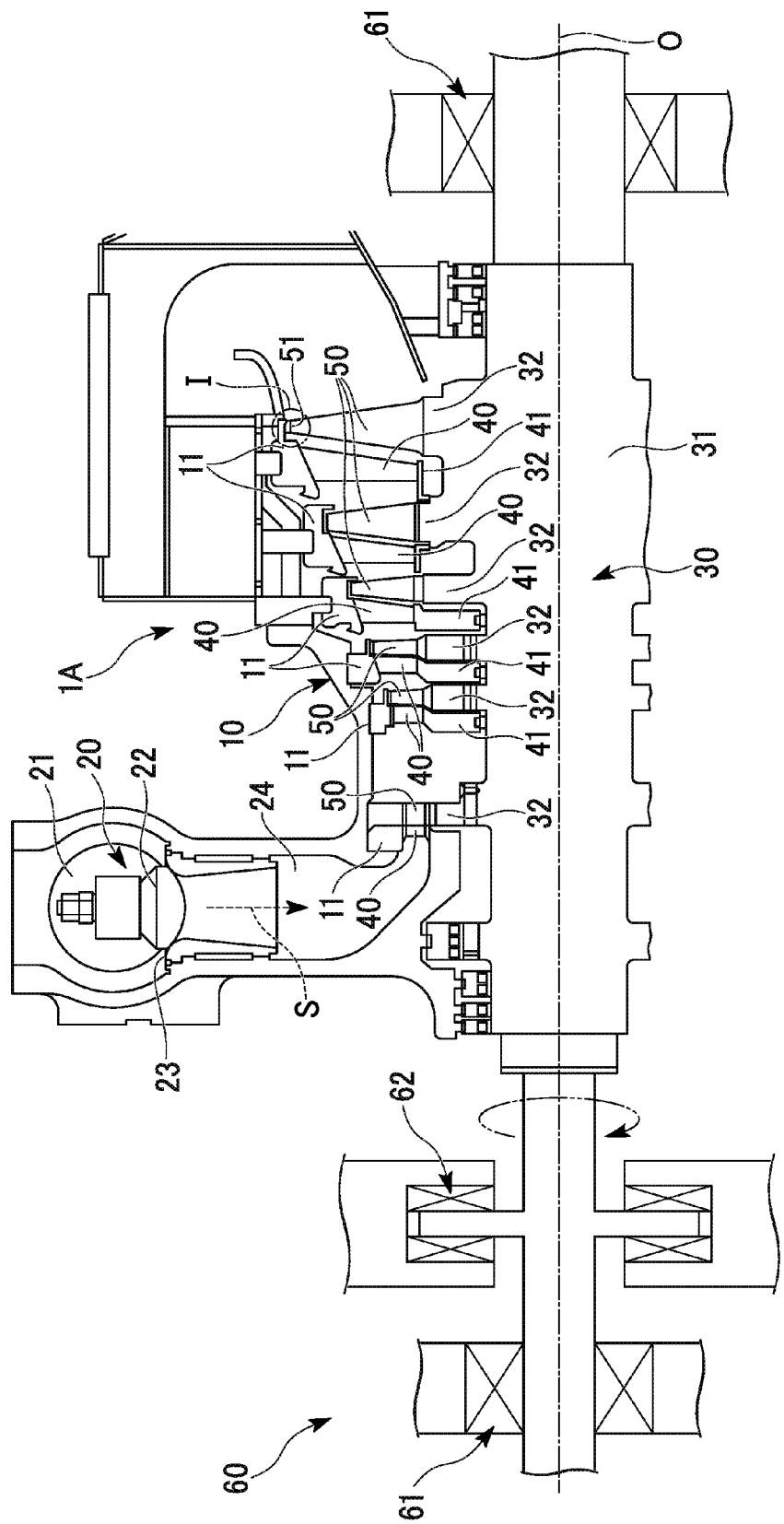
FIG. 1 is a schematic cross-sectional view illustrating a steam turbine according to a first embodiment of the invention.

As illustrated in FIG. 1, the steam turbine 1A is constituted mainly of a casing 10, an adjusting valve 20 that adjusts the amount and pressure steam S that flows into the casing 10, a shaft 30 that is rotatably provided inside the casing 10 to transmit power to machines, such as a generator (not illustrated), a turbine vane 40 that is held by the casing 10, a turbine blade 50 that is provided on the shaft 30, and a bearing section 60 that rotatably supports the shaft 30 around an axis.

The casing 10 has an internal space hermetically sealed, and serves as a flow channel for the steam S. A ring-shaped outer partition plate ring (stator) 11 through which the shaft 30 is inserted is firmly fixed to an inner wall surface of the casing 10.

A plurality of the adjusting valves 20 are attached to the inside of the casing 10. Each adjusting valve 20 is equipped with an adjusting valve chamber 21 into which the steam S flows from a boiler (not illustrated), a valve body 22, and a valve seat 23. The adjusting valve 20 is configured so that, if the valve body 22 is separated from the valve seat 23, a steam flow channel is open and the steam S flows into the internal space of the casing 10 via the steam chamber 24.

The shaft 30 is equipped with a main shaft body 31 and a plurality of disks 32 extending in a radial direction from an outer periphery of the main shaft body 31. The shaft 30 transmits rotational energy to machines, such as the generator (not illustrated).

The bearing section 60 is equipped with a journal bearing device 61 and a thrust bearing device 62. The bearing section 60 rotatably supports the shaft 30.

A number of the turbine vanes 40 are radially arranged to constitute an annular turbine vane group so as to surround the shaft 30 and are held by the aforementioned outer partition plate rings 11, respectively. The insides of the turbine vanes 40 in the radial direction are coupled together by ring-shaped hub shrouds 41 through which the shaft 30 is inserted, and tip portions thereof are disposed with a gap in the radial direction with respect to the shaft 30.

Six annular turbine vane groups consisting of the plurality of turbine vanes 40 are formed at predetermined intervals in the axial direction and are configured so as to convert the pressure energy of the steam S into kinematic energy to guide the converted kinematic energy to the turbine blade 50 side adjacent to a downstream side.

The turbine blade 50 is firmly attached to an outer peripheral portion of the disk 32 provided in the shaft 30. A number of the turbine blades 50 are radially arranged on a downstream side of each annular turbine vane group so as to constitute an annular turbine blade group.

The annular turbine vane groups and the annular turbine blade groups form one stage for every set. That is, the steam turbine 1A is constituted of six stages. Among these six stages, a tip portion of the turbine blade 50 in the last stage serves as a tip shroud (rotor) 51 that extends in a circumferential direction. The tip shroud 51 is arranged to face the outer partition plate ring 11 via a gap in the radial direction of the casing 10. Also, the tip shroud 51 is housed in an annular groove 11a formed in a region corresponding to the tip shroud 51 of the outer partition plate ring 11.

Here, as illustrated in FIG. 2A, the steam turbine 1A is equipped with a stepped portion 52 provided at the tip shroud 51, a seal fin 15 that extends from the outer partition plate ring 11 toward the stepped portion 52, and a partition plate 70 that is provided so as to face the downstream side of the seal fin 15.

The stepped portion 52 is provided at the tip shroud 51 serving as the tip portion of the turbine blade 50 in the last stage, has a stepped surface 53, and protrudes to the outer partition plate ring 11 side.

In the present embodiment, the tip shroud 51 is provided with three stepped portions 52 (52A to 52C). The three stepped portions 52 (52A to 52C) are disposed so that the protruding heights thereof from the turbine blade 50 become gradually greater from an upstream side toward a downstream side in the direction of an axis O of the shaft 30. That is, three stepped surfaces 53 (53A to 53C) that form steps are formed in the stepped portions 52 (52A to 52C) so as to face the upstream side in the axial direction.

Here, in the present embodiment, a groove bottom surface 11b in the annular groove 11a of the outer partition plate ring 11 is also formed in a step shape toward the direction of the axis O so as to correspond to the stepped portions 52, respectively, in the direction of the axis O.

Seal fins 15 (15A to 15C) are provided to extend from the groove bottom surface 11b of the outer partition plate ring 11. The seal fins 15 (15A to 15C) are provided so as to form minute gaps H in the radial direction between the stepped portions 52 (52A to 52C) in correspondence with to the stepped portions 52 (52A to 52C), respectively, in a 1:1 ratio. The size of the minute gaps H (H1 to H3) are set to minimum values within a safe range where both the seal fins and the outer partition plate ring do not contact each other, after the thermal expansion of the casing 10 or the turbine blade 50, the centrifugal expansion of the turbine blade 50, or the like is taken into consideration.

Here, in the present embodiment, the stepped surface 53B is located on the downstream side of the seal fin 15A, the stepped surface 53C is located on the downstream side of the seal fin 15B, and the stepped surface 53A is located on the upstream side of the seal fin 15A. Also, a configuration is provided in which the steam S is guided to a radial outer side within a cavity C1 to be described below by the stepped surface 53A, the steam S is guided to a radial outer side within a cavity C2 to be described below by the stepped surface 53B, and the steam S is guided to a radial outer side within a cavity C3 by the stepped surface 53C to be described below.

On the basis of such a configuration, the cavities C (C1 to C3) are formed corresponding to the stepped portions 52 (52A to 52C), respectively, within the annular groove 11a between the tip shroud 51 side and the outer partition plate ring 11.

The cavities C (C1 to C3) are formed between the seal fins 15 (15A to 15C) corresponding to the stepped portions 52 (52A to 52C), respectively, and partition walls that face the seal fins 15 (15A to 15C) on the upstream side in the direction of the axis O.

More specifically, in the first cavity C1 corresponding to the stepped portion 52A in a first stage located on the most upstream side in the direction of the axis O, the partition wall is formed by an inner wall surface 54 of the annular groove 11a on the upstream side in the axial direction. Therefore, the first cavity C1 is formed between the inner wall surface 54 and the seal fin 15A corresponding to the stepped portion 52A in the first stage and between the tip shroud 51 side and the outer partition plate ring 11.

Additionally, in the second cavity C2 corresponding to the stepped portion 52B in a second stage, the partition wall is formed by the seal fin 15A corresponding to the stepped portion 52A located on the upstream side in the axial direction. Therefore, the second cavity C2 is formed between the seal fin 15A and the seal fin 15B and between the tip shroud 51 and the outer partition plate ring 11.

Similarly, the third cavity C3 is formed between the seal fin 15B and the seal fin 15C and between the tip shroud 51 and the outer partition plate ring 11.

Next, the partition plate 70 will be described.

The partition plate 70 is an annular member that is provided so as to face each seal fin 15 (the seal fin 15A or the seal fin 15B in the present embodiment) on the downstream side of each seal fin 15 and that is provided so as to extend parallel to each seal fin 15 (15A, 15B) and radially inward from the groove bottom surface 11b of the outer partition plate ring 11. Moreover, a steam flow channel FC that introduces the steam S is defined between the partition plate 70 and the corresponding seal fin 15 (15A, 15B), and a communication portion 70b that allows a space on a downstream side of the partition plate 70 in each cavity C (C1, C2) and the steam flow channel FC to communicate with each other is formed at the position of the partition plate 70 on the radial outer side.

The communication portion 70b may be a plurality of holes that pass through the partition plate 70 in the direction of the axis O or may be slits that are formed at intervals in the circumferential direction, and may have arbitrary shapes as long as the communication portion passes through the partition plate 70 at any position in the circumferential direction.

Additionally, the partition plate 70 may be supported by the corresponding seal fin 15 with ribs or the like, and thereby be provided on the downstream side of each seal fin 15. In this case, the communication portion 70b is formed so as to be open in the entire circumferential region.

Also, although an end edge portion of the partition plate 70 on a radial inner side is located radially outside the seal fin 15 (15A, 15B) and the extension size thereof is smaller than the seal fin 15 (15A, 15B), it is preferable that the end edge portion have a size equal to or less than the extension size of at least the seal fin 15 (15A, 15B).

In this way, the partition plate 70 makes the steam S flow radially inward within the steam flow channel FC along a steam introduction surface (fluid introduction surface) 70a, which is a surface that faces the corresponding seal fin 15 (15A, 15B) and faces the upstream side, and guides the steam S to the above minute gap H (H1 to H3).

In such a steam turbine 1A, first, if the adjusting valve 20 (refer to FIG. 1) is brought into an open state, the steam S flows into the internal space of the casing 10 from the boiler (not illustrated).

The steam S that has flowed into the internal space of the casing 10 passes sequentially through the annular turbine vane groups and the annular turbine blade group in each stage. In this case, pressure energy is converted into kinematic energy by the turbine vanes 40, most of the steam S that has passed through the turbine vanes 40 flows in between the turbine blades 50 that constitute the same stage, the kinematic energy of the steam S is converted into rotational energy by the turbine blades 50, and rotation force is applied to the shaft 30. On the other hand, a portion (for example, several percents) of the steam S becomes a so-called leakage flow that flows into the annular groove 11a after flowing out of the turbine vanes 40.

Here, as illustrated in FIG. 2A, the steam S that has flowed into the annular groove 11a causes a main vortex Y1 that turns counterclockwise on the plane shown FIG. 2A so as to flow into the first cavity C1, collide against the stepped surface 53A of the stepped portion 52A, and return to the upstream side. Then, the main vortex Y1 can be generated with certainty by providing the stepped portion 52A in this way.

In this case, as a partial flow is separated from the above main vortex Y1 particularly in the above end edge portion 55 of the stepped portion 52A, a counter vortex Y2 is generated so as to turn in a direction opposite to the main vortex Y1, that is, clockwise on the plane shown in FIG. 2A in the present example. The counter vortex Y2 produces a flow reduction effect of radially inward pressing a leakage flow that passes through the minute gap H1 between the seal fin 15A and the stepped portion 52A, thereby reducing a flow rate.

Additionally, even on the upstream side of the seal fin 15B, similar to the upstream side of the seal fin 15A, the main vortex Y1 and the counter vortex Y2 are formed, and the flow reduction effect of reducing the flow rate of the leakage flow is produced.

Here, a portion of the steam S that forms the main vortex Y1 is introduced from the communication portion 70b on the radial outer side to the steam flow channel FC, flows radially inward along the steam introduction surface 70a and is guided toward the above minute gap H (H1, H2). Therefore, the flow direction of the steam S in the main vortex Y1 can be changed to a radial inward direction on the downstream side of the seal fin 15 (15A, 15B).

Hence, the leakage flow that has passed through the minute gap H (H1, H2) can be directed radially inward so as to become a flow illustrated by a solid line from a flow illustrated by a dashed line of FIG. 2B. In other words, the clearance of the minute gap H (H1, H2) is artificially made small.

According to the steam turbine 1A of the present embodiment, by providing the partition plate 70 on the downstream side of each seal fin 15 (15A, 15B), the leakage flow that has passed the minute gap H (H1, H2) is directed radially inward, and the flow reduction effect of the leakage flow can be further improved.

Second Embodiment

Next, a steam turbine 100 according to a second embodiment of the invention will be described.

In addition, constituent elements common to those of the first embodiment are designated by the same reference numerals, and detailed description thereof is omitted.

In the present embodiment, the shape of the partition plate 103 is different from that of the first embodiment.

Figure 3:
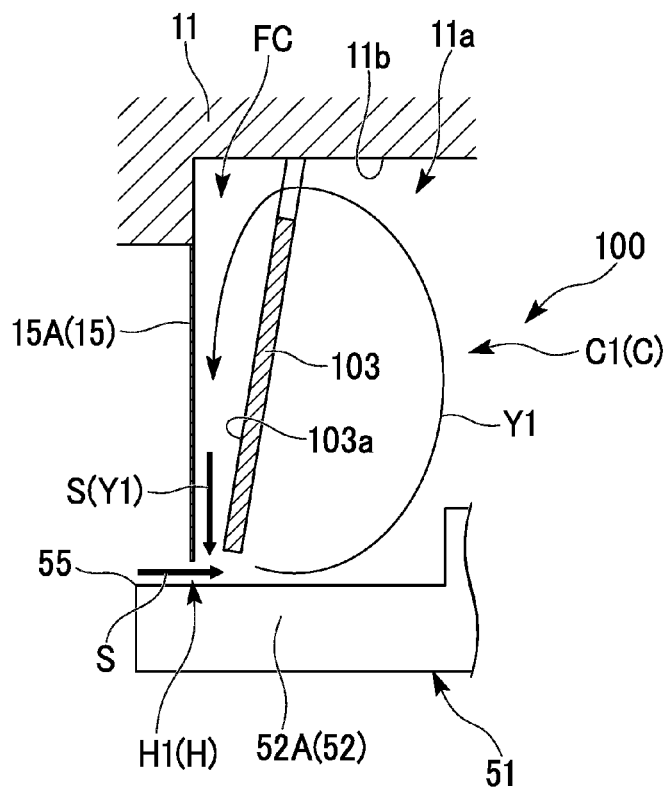
FIG. 3 is a view illustrating a steam turbine according to a second embodiment of the invention, and is an enlarged cross-sectional view illustrating the periphery of a cavity on an upstream side at the same position as the main portion I in FIG. 1.

As illustrated in FIG. 3, the partition plate 103 is provided so as to be inclined to the upstream side such that the cross-section thereof in the circumferential direction of the axis O has a linear shape, from the radial outer side toward the radial inner side. In other words, the partition plate 103 is provided so that the steam flow channel FC becomes narrow in the direction of the axis O gradually toward the radial inner side.

According to such a steam turbine 100, as the partition plate 103 inclines toward the downstream side on the radial outer side, more steam S from the main vortex Y1 can be introduced into the steam flow channel FC. Moreover, since the steam flow channel FC becomes narrow gradually toward the radial inner side by using the inclined partition plate 103, the steam S introduced into steam flow channel FC increases flow velocity, flowing along the steam introduction surface 103a.

Therefore, the force of radially inward pressing the leakage flow that has passed the minute gap H (H1, H2) can be further increased, the flow reduction effect of the leakage flow can be improved, and the leakage flow rate can be further reduced.

Figure 4:
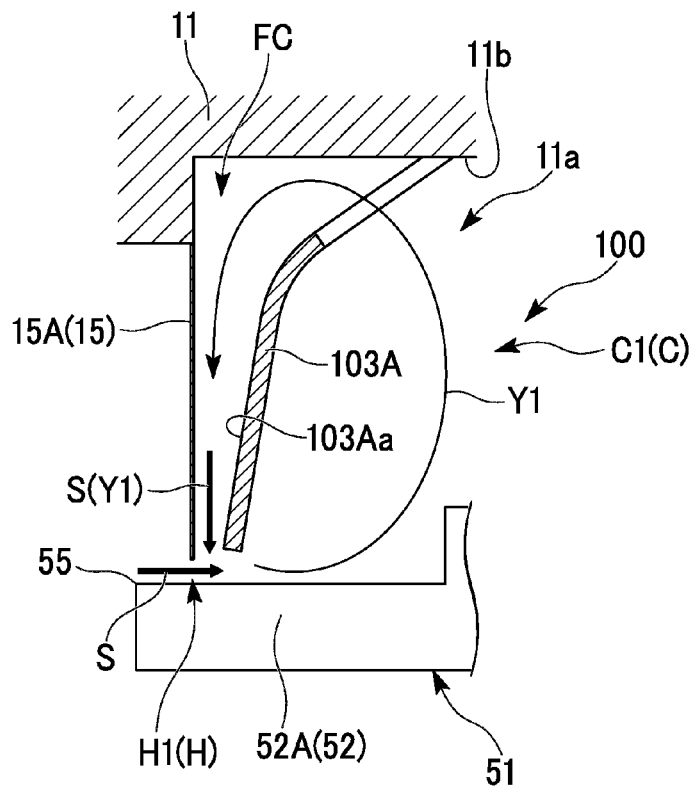
FIG. 4 is a view illustrating the steam turbine according to a modified example of a second embodiment of the invention, and is an enlarged cross-sectional view illustrating the periphery of the cavity on the upstream side at the same position as the main portion I in FIG. 1.

Here, as illustrated in FIG. 4, the partition plate 103A may be provided such that the cross-section thereof in the circumferential direction of the axis O has a curved shape. That is, the partition plate is bent to the upstream side from the radial outer side toward the radial inner side, has a curved shape that the cross-section thereof in the circumferential direction swells to the upstream side, and is provided so as to become substantially parallel to the seal fin 15 (15A, 15B) on the radial inner side. By virtue of such a shape, more steam S can be introduced into the steam flow channel FC from the main vortex Y1 on the radial outer side, and the steam S can be made to flow along the steam introduction surface 103Aa, with a flow direction of the steam S within the steam flow channel FC being the radial direction on the radial inner side. Hence, the flow reduction effect of the leakage flow can be further enhanced.

Third Embodiment

Next, a steam turbine 110 according to a third embodiment of the invention will be described.

In addition, constituent elements common to those of the first and second embodiments are designated by the same reference numerals, and detailed description thereof is omitted.

The present embodiment is different from a first embodiment and a second embodiment in that a block member 113 is used instead of the partition plate 70 (103, 103A) that forms the steam introduction surface 110a.

Figure 5:
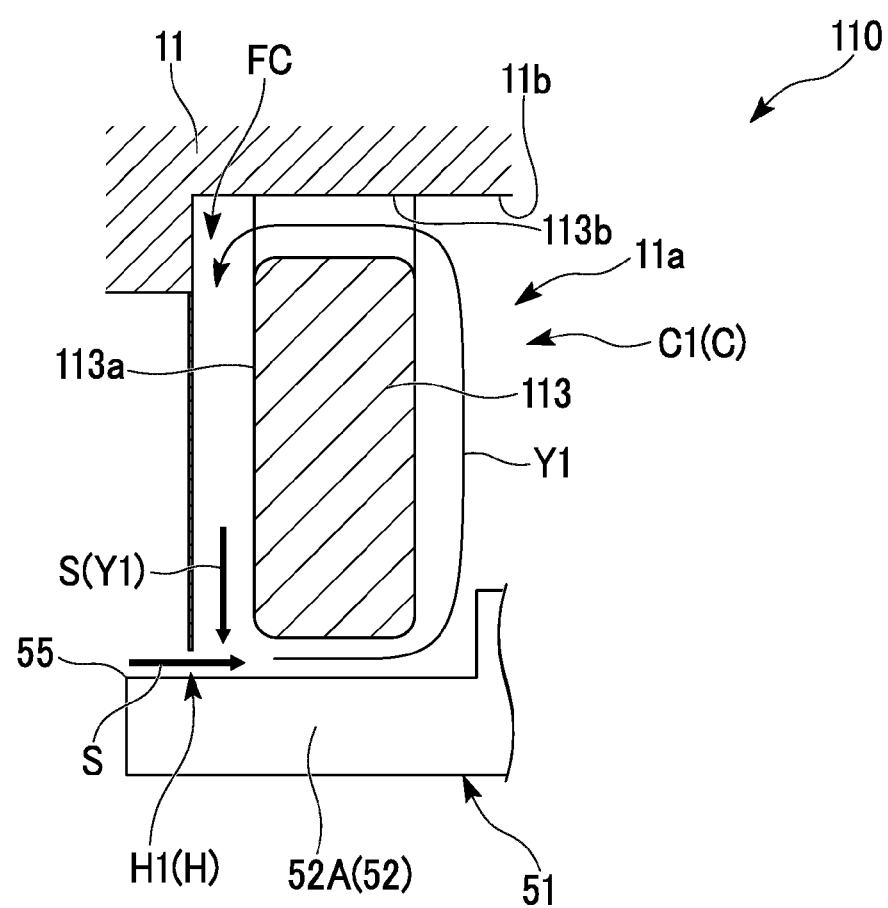
FIG. 5 is a view illustrating a steam turbine according to a third embodiment of the invention, and is an enlarged cross-sectional view illustrating the periphery of a cavity on an upstream side at the same position as the main portion I in FIG. 1.

As illustrated in FIG. 5, the block member 113 has an annular shape and has a certain degree of thickness in the direction of the axis O so as to be exactly located inside the main vortex Y1. Additionally, the cross-section of the block member 113 in the circumferential direction has a substantially quadrangular shape. That is, the steam introduction surface 113a is a surface where each block member 113 faces the corresponding seal fin 15 (15A, 15B). Additionally, a communication portion 113b that allows each cavity C (C1, C2) and the steam flow channel FC communicate with each other is formed similarly to the first and second embodiments at the position on the radial outer side.

According to such a steam turbine 110, the main vortex Y1 can be made to flow along the surface of the block member 113, and all the steam S that forms the main vortex Y1 can be guided into the steam flow channel FC. Therefore, more steam S can be made to flow toward the minute gap H (H1, H2), and the flow reduction effect of the leakage flow that has passed the minute gap H (H1, H2) can be further obtained. In addition, although the cross-section of the block member 113 in the circumferential direction may have a perfect quadrangular shape, it is preferable that the block member has a shape in which the corners have a rounded shape and have roundness as illustrated in FIG. 5.

In addition, in the present embodiment, the cross-section of the block member 113 in the circumferential direction has a quadrangular shape. The invention is not limited to this, and the steam S that flows through at least the steam flow channel FC may be able to reduce the leakage flow that has passed through the minute gap H (H1, H2).

Figure 6A:
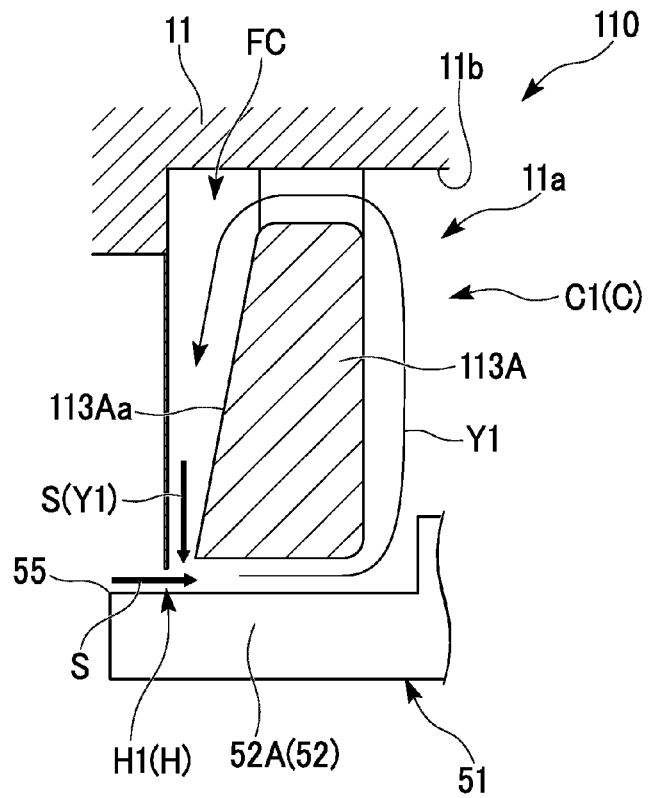
FIG. 6A is a view illustrating the steam turbine according to a first modified example of the third embodiment of the invention, and is an enlarged cross-sectional view illustrating the periphery of the cavity on the upstream side at the same position as the main portion I in FIG. 1.

For example, as illustrated in FIG. 6A, a steam introduction surface 113Aa in a block member 113A may be formed so as to incline to the upstream side from the radial outer side toward the radial inner side. In this case, as described in the second embodiment, the flow reduction effect of the leakage flow can be further improved. In addition, it is preferable that the block member 113A have a shape in which corners have a rounded shape and have roundness as illustrated in FIG. 6 A.

Figure 6B:
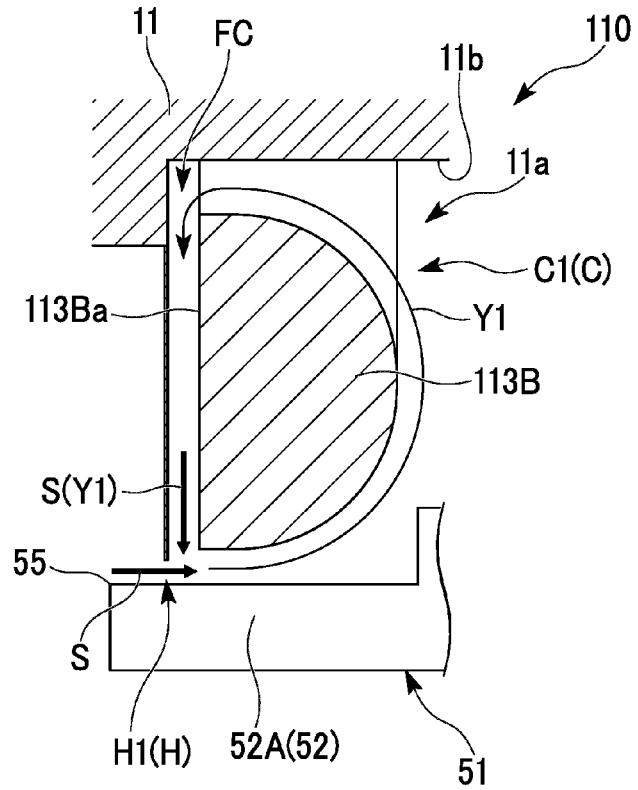
FIG. 6B is a view illustrating the steam turbine according to a second modified example of the third embodiment of the invention, and is an enlarged cross-sectional view illustrating the periphery of the cavity on the upstream side at the same position as the main portion I in FIG. 1.

Additionally, as illustrated in FIG. 6B, the surfaces of the block member 113B other than a steam introduction surface 113Ba may have a curved shape in the cross-section in the circumferential direction so as to run along the main vortex Y1. In this case, since the block member 113B does not block the flow of the main vortex Y1, the flow reduction effect of the leakage flow can be improved.

Although the embodiments of the invention have been described above in detail, some design changes can also be made without departing from the technical idea of the invention.

Figure 7:
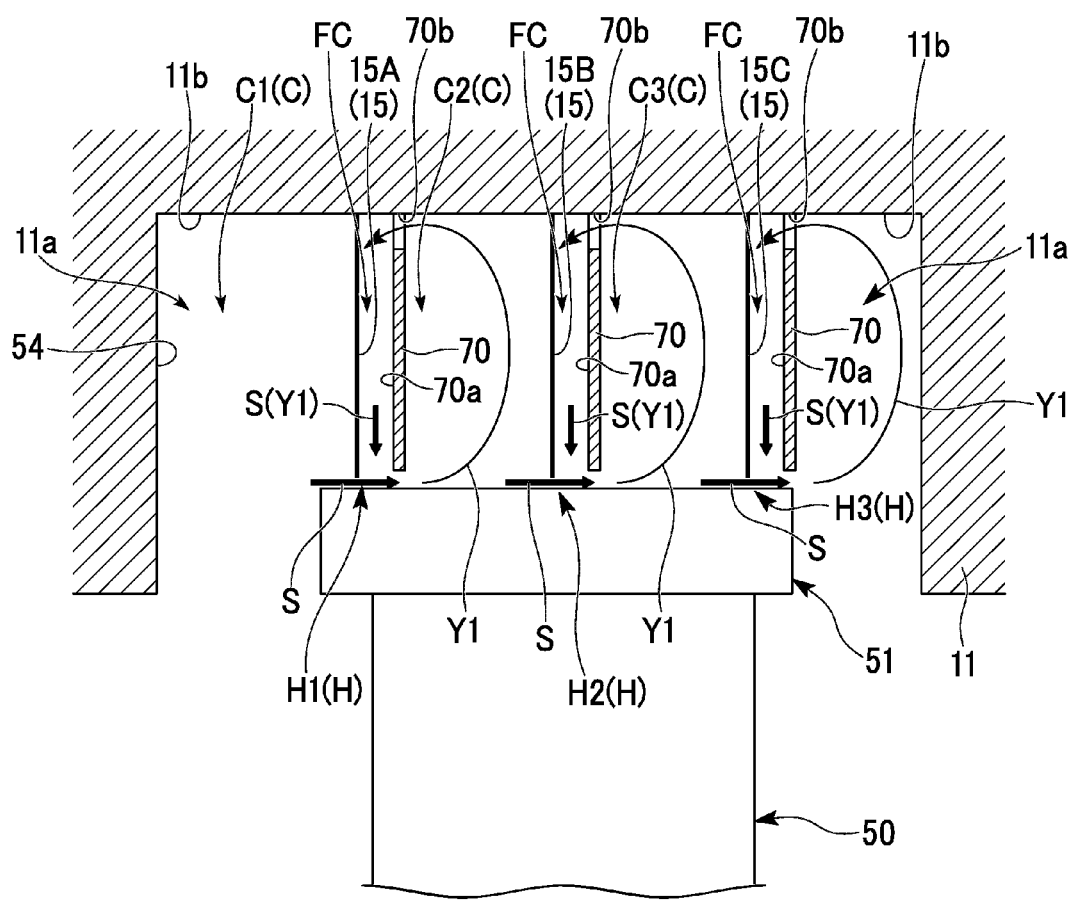
FIG. 7 is a view illustrating a case where a stepped portion is not provided in the steam turbine of the invention, and is an enlarged cross-sectional view illustrating the same position as the main portion I in FIG. 1.

For example, as illustrated in FIG. 7, the stepped portions 52 are not necessarily provided at the tip shroud 51 serving as the tip portion of the turbine blade 50 in the last stage. Even in such a case, since the main vortex Y1 is generated depending on the viscosity of the steam S, the flow reduction effect of the leakage flow by the steam introduction surface 70a (103a, 103Aa, 113Aa, 113Ba) can be obtained. In addition, although the groove bottom surface 11b in the annular groove 11a of the outer partition plate ring 11 is not formed in a step shape in FIG. 7, the groove bottom surface may have a step shape, similar to the first to third embodiments.

Moreover, in the above-described embodiments, the reduction in the flow rate of the leakage flow between the turbine blade 50 and the outer partition plate ring 11 has been described. However, for example, the same technique can also be applied between the turbine vane 40 and the shaft 30. Additionally, in the embodiments, the tip shroud 51 serving as the tip portion of the turbine blade 50 is formed with the stepped portions 52 (52A to 52C), and the outer partition plate ring 11 is provided with the seal fins 15 (15A to 15C). However, contrary to this, the outer partition plate ring 11 may be formed with the stepped portions 52, and the tip shroud 51 may be provided with the seal fins 15.

Additionally, in the above-described embodiments, the steam turbine 1A (100, 110) has been described as an example of the rotating machine. However, rotating machines, such as a gas turbine and a compressor, may be used, or the invention can also be applied to a seal structure provided on the shaft 30.

INDUSTRIAL APPLICABILITY

According to the above-described rotating machine, it is possible to guide a vortex fluid between the seal fin and the fluid introduction surface, thereby pressing the leakage flow passing through the gap to the downstream side of the seal fin and further reducing the leakage flow rate.

REFERENCE SIGNS LIST

1A: STEAM TURBINE (ROTATING MACHINE)
10: CASING
11: OUTER PARTITION PLATE RING (STATOR)
11a: ANNULAR GROOVE
11b: GROOVE BOTTOM SURFACE
20: ADJUSTING VALVE
21: ADJUSTING VALVE CHAMBER
22: VALVE BODY
23: VALVE SEAT
30: SHAFT
31: MAIN SHAFT BODY
32: DISK
40: TURBINE VANE
41: HUB SHROUD
50: TURBINE BLADE
51: TIP SHROUD (ROTOR)
52: STEPPED PORTION
53: STEPPED SURFACE
54: INNER WALL SURFACE
55: END EDGE PORTION
60: BEARING SECTION
61: JOURNAL BEARING DEVICE
62: THRUST BEARING DEVICE
70: PARTITION PLATE
70a: STEAM INTRODUCTION SURFACE (FLUID INTRODUCTION SURFACE)
70b: COMMUNICATION PORTION
FC: STEAM FLOW CHANNEL (SPACE)
S: STEAM
O: AXIS
Y1: MAIN VORTEX
Y2: COUNTER VORTEX
H: MINUTE GAP
C: CAVITY
100: STEAM TURBINE
103: PARTITION PLATE
103a: STEAM INTRODUCTION SURFACE
103A: PARTITION PLATE
110: STEAM TURBINE
113: BLOCK MEMBER
113a: STEAM INTRODUCTION SURFACE (FLUID INTRODUCTION SURFACE)
113b: COMMUNICATION PORTION
113A: BLOCK MEMBER
113Aa: STEAM INTRODUCTION SURFACE (FLUID INTRODUCTION SURFACE)
113B: BLOCK MEMBER
113Ba: STEAM INTRODUCTION SURFACE (FLUID INTRODUCTION SURFACE)

The invention claimed is:

1. A rotating machine through which a fluid flows along an axis, the rotating machine comprising:
a rotor that extends with the axis as a center;
a stator that is provided so as to face a radial direction of the rotor and be capable of rotating relative to the rotor around the axis;
a seal fin that extends from the stator to the rotor and forms a gap between the seal fin and the rotor; and
a partition plate that extends from the stator to the rotor, is disposed downstream of the seal fin, and faces the seal fin,
wherein a cavity is enclosed by the seal fin, the stator and the rotor, and a vortex generated from a leakage flow passing through the gap is formed in the cavity,
wherein the cavity includes a first space and a second space defined by the partition plate, the first space being between the seal fin and the partition plate, and the second space being in a downstream side of the cavity,
wherein the partition plate includes a communication portion and a fluid introduction surface, the communication portion is formed on the stator side of the partition plate and communicates with the first space and with the second space, and the fluid introduction surface faces the seal fin, wherein a fluid flow passing through the communication portion toward the gap is introduced from the second space to the first space, and wherein the fluid introduction surface guides a fluid flow passing through the communication portion toward the gap, and the leakage flow is pressed against the rotor by the fluid flow.

2. The rotating machine according to claim 1, wherein the fluid introduction surface is provided to incline such that the fluid introduction surface is directed from a downstream side toward an upstream side, toward the rotor from the stator.

3. The rotating machine according to claim 2, further comprising:

a stepped surface that is provided at a position that faces the gap, at a position that becomes the downstream side of the seal fin in the rotor, and that guides the leakage flow to the stator side within the cavity toward the upstream side.

4. The rotating machine according to claim 1, further comprising:

a stepped surface that is provided at a position that faces the gap, at a position that becomes a downstream side of the seal fin in the rotor, and that guides the leakage flow to the stator side within the cavity toward an upstream side.

5. The rotating machine according to claim 1, wherein an extension size of the partition plate is smaller than an extension size of the seal fin.

\* \* \* \* \*